M. T. CONVERY.
NUT LOCK.
APPLICATION FILED APR. 8, 1913. RENEWED MAR. 11, 1914.
1,093,316.
Patented Apr. 14, 1914.
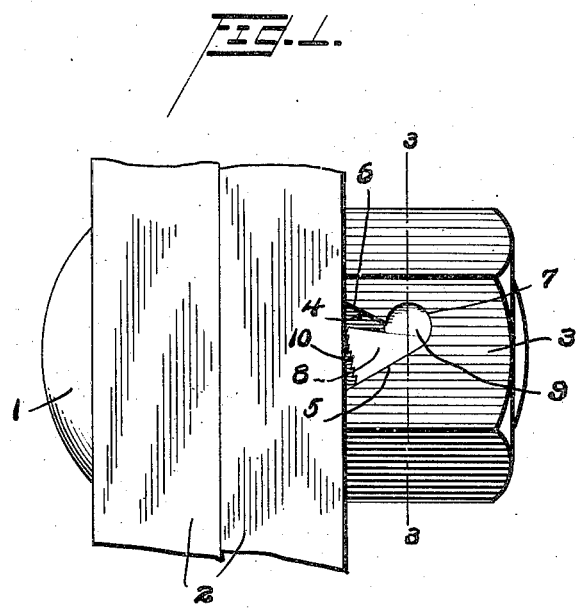
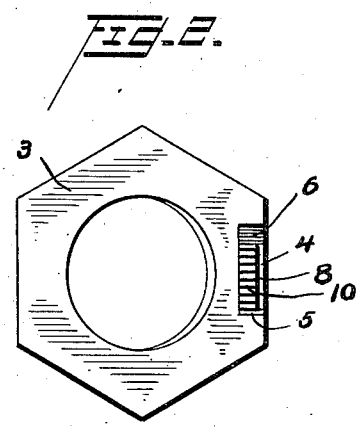
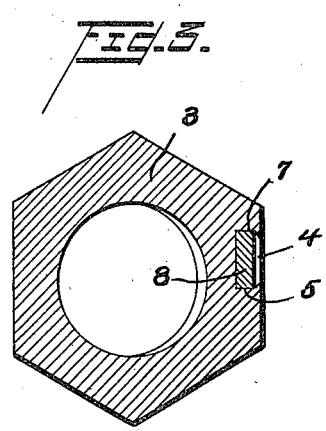
Witnesses
H. Strauss
C. R. Ziegler
Inventor
Martin T. Convery
By Joshua R. H. Potts
Attorney

UNITED STATES PATENT OFFICE.

MARTIN T. CONVERY, OF PHILADELPHIA, PENNSYLVANIA.

NUT-LOCK.

1,093,316.  Specification of Letters Patent.  Patented Apr. 14, 1914.

Application filed April 8, 1913, Serial No. 759,590. Renewed March 11, 1914. Serial No. 824,049.

*To all whom it may concern:*

Be it known that I, MARTIN T. CONVERY, a citizen of the United States, residing at Philadelphia, in the county of Philadelphia and State of Pennsylvania, have invented certain new and useful Improvements in Nut-Locks, of which the following is a specification.

My invention relates to improvements in nut locks, the object of the invention being to provide a nut with improved locking means which operates to prevent movement in a rearward direction after the nut is screwed home.

A further object is to provide improvements of this character which are of extremely simple inexpensive construction, strong and durable in use.

With these and other objects in view, the invention consists in certain novel features of construction and combinations and arrangements of parts as will be more fully hereinafter described and pointed out in the claim.

In the accompanying drawings: Figure 1 is a view in elevation illustrating my improvements in locked position. Fig. 2 is a bottom plan view of the nut, and Fig. 3 is a view in section on the line 3—3 of Fig. 1.

1 represents a bolt projected through articles 2 to be secured, and 3 is my improved nut screwed onto the bolt 1 against the article 2 which we will assume is of metal, as for example, an ordinary fish plate.

While I shall describe my improvements in connection with a nut, it is of course to be understood that it is equally well adapted for use in connection with a bolt head, screw head, etc., as well as with a nut.

The nut 3 is of general hexagonal form and in one face is provided with a recess 4. One wall 5 of this recess is comparatively straight and merges into a circular end 7, while the other wall 6 of said recess is at an angle to the wall 5, so that a recess having a rounded inner end and a flaring or triangular outer end is formed. In the recess 4, a dog 8 is located and has a rounded end 9 which fits within the circular end 7 and oscillates therein. The free end of the dog is provided with teeth 10 to engage the article 2. It will be noted that the recess 4 is deeper than the thickness of the dog 8, so that by rolling or stamping the curved wall 7, so that the metal projects over the surface of the dog as indicated clearly in Fig. 3, the dog will be effectually secured to the nut without other attaching means. When the nut is screwed home, one edge of the dog 8 lies against the straight wall 5 of recess 4, and the other edge of the dog is in substantial alinement with the center or axis of the circular end 9 of the dog. Hence when the nut is screwed home, any attempt to move in the reverse direction is immediately prevented because the dog begins to act, jamming the nut against movement, and the greater pressure applied to unscrew the tighter will be the lock.

Various slight changes might be made in the general form and arrangement of parts described without departing from my invention, and hence I do not limit myself to the precise details set forth, but consider myself at liberty to make such changes and alterations as fairly fall within the spirit and scope of the appended claim.

Having thus described my invention, what I claim as new and desire to secure by Letters Patent is:

As a new article of manufacture, a nut having a recess in one face, said recess having a curved inner end constituting a bearing, and a flared outer end, said recess at the point of juncture between the bearing and the flared outer end of a width less than the diameter of the bearing, a dog located in the recess and having a curved inner end mounted to turn in the bearing, and the wall of said curved inner end of the recess projected over the curved portion of the dog, substantially as described.

In testimony whereof I have signed my name to this specification in the presence of two subscribing witnesses.

MARTIN T. CONVERY.

Witnesses:
 C. R. ZIEGLER,
 C. E. POTTS.